United States Patent [19]

Tournier

[11] 4,267,713

[45] May 19, 1981

[54] MACHINE FOR DEPILATING THE SKINS OF SLAUGHTERED ANIMALS

[76] Inventor: Claude Tournier, Lioujas, 12000 Rodez, France

[21] Appl. No.: 100,226

[22] Filed: Dec. 4, 1979

[30] Foreign Application Priority Data

Dec. 4, 1978 [FR] France ............................ 78 34721

[51] Int. Cl.³ .................... C14B 15/00; C14C 1/00
[52] U.S. Cl. ......................................... 69/24; 69/30
[58] Field of Search ............... 69/28, 29, 30, 32, 24; 68/139, 142

[56] References Cited

U.S. PATENT DOCUMENTS 3,818,730  6/1974  Casanora et al. ..................... 69/30

4,118,959 10/1978 Waite ..................................... 69/30

*Primary Examiner*—Patrick D. Lawson
*Attorney, Agent, or Firm*—Larson and Taylor

[57] ABSTRACT

A machine for removing the hair from animal hides, comprises an upwardly open vat and a horizontal perforated plate arranged in the lower part of the vat and rotationally driven on a central pivot by suitable means. The plate is provided on its surface in contact with the material to be treated with sharp edges formed on the contour of said perforations, and bounded peripherally by a fixed perforated cylinder, defining with the inner wall of the vat a coronary space ensuring the removal of the hair stripped off and projected by centrifugal force into the openings of said cylinder.

11 Claims, 3 Drawing Figures

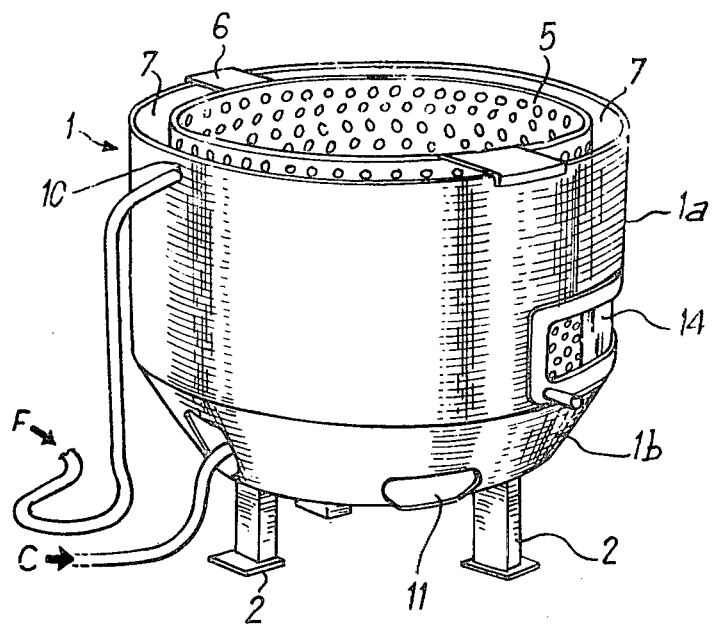
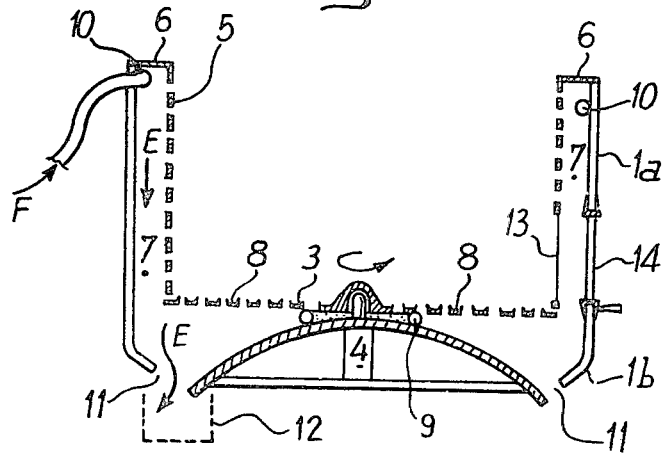

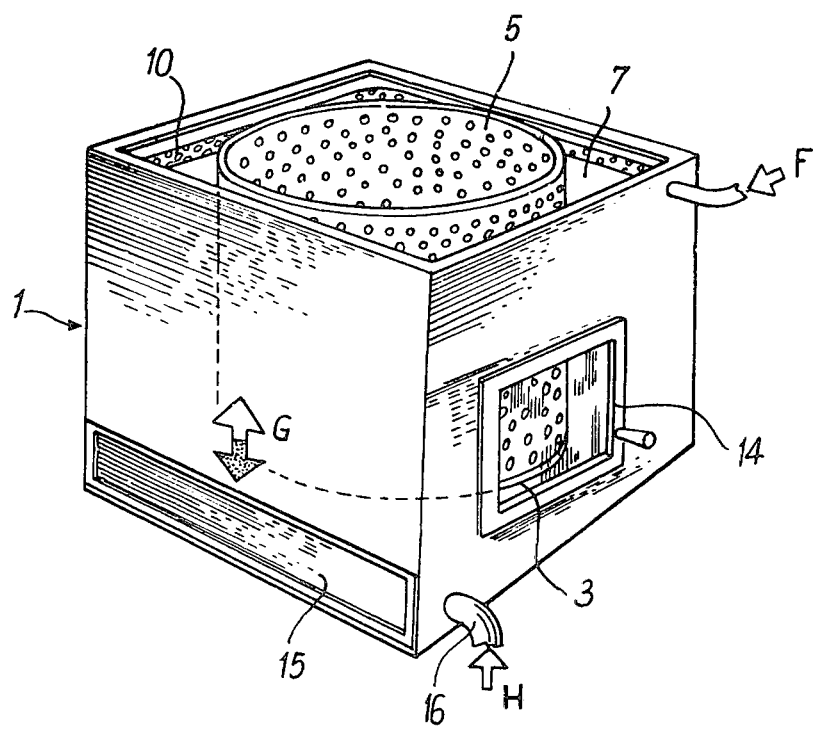

MACHINE FOR DEPILATING THE SKINS OF SLAUGHTERED ANIMALS

BACKGROUND OF THE INVENTION

1. Field of the Invention

The present invention relates to a machine for depilating animals and it is applied more particularly to the external treatment of the skin of previously boned ungulate animals.

2. Description of the Prior Art

Until now machines carrying out an identical operation are known, such as that described in French Certificate of Addition No. 2,112,689, for "Device for skinning panses and washing vegetables". The latter is constituted by an upwardly open vat for introducing the previously heated pieces to be skinned and by a perforated horizontal plate, arranged in the lower part of the vat and driven on a central pivot by suitable rotating means. The interior of the vat has bosses freely distributed over its inner wall and on the top of the rotary plate. These bosses are for the purpose of stirring a mixture of feet and/or heads of hoofed animals already scalded and of scraper elements constituted essentially by the hoofs of these animals and this, under permanent sprinkling with very hot water. Thus, the adherence of the hair diminishing under the effect of the heat, the hoofs tear off the hair from the skin which is driven by the flow of hot water to the recovery tanks.

However, such a machine has certain drawbacks. The bodies to be skinned must necessarily have good rigidity to enable the scraping of the hoofs on the hair of the hide which, obviously, considerably spoils the yield of the machine since the bony tissue occupies a predominant place in the trotters and the heads of hoofed animals. The yield of the machine is also restricted by the presence of the scraper elements. In addition, when the epilation is finished, it is necessary to sort out the scraper elements and the treated parts for the purposes of the particular uses of each.

It is an object of the present invention to provide a machine which overcomes these drawbacks.

It is another object of the invention to provide a machine which does not use either scraper elements nor the rigidity of the pieces to be skinned.

It is a further object to provide a machine which fulfils the function of scalding.

GENERAL DESCRIPTION OF THE INVENTION

According to the invention, there is provided a machine, comprising conventionally an upwardly open vat and a horizontal perforated plate driven in rotation, characterized by the fact that the latter is:

on the one hand, provided on its surface in contact with the skins to be depilated, with sharp edges designed on the contour of said perforations;

on the other hand, bounded peripherally by a fixed perforated cylinder, defining with the inner wall of the vat, a coronary space ensuring the removal of the stripped hairs and projected under the effect of centrifugal force exerted by the rotation of the plate, into the openings of said cylinder. Thus, the sharp edges designed on the contour of the perforations of the plate replace the scraper elements and the honeycombed cylinder defines a filter for the passage of the depilated fleshy part.

Other features and other advantages of the present invention will emerge on reading the description which follows, giving, by way of non-limiting examples and in conjunction with the accompanying drawings, various embodiments of a machine according to the invention.

BRIEF DESCRIPTION OF THE DRAWINGS

In the drawings:

FIG. 1 shows a perspective view of a first embodiment of a machine according to the invention;

FIG. 2 is a vertical, sectional view of the embodiment of the machine shown in FIG. 1;

FIG. 3 is a perspective view of another embodiment of the machine according to the invention.

DESCRIPTION OF PREFERRED EMBODIMENTS

The machine shown in the group of FIGS. 1 and 2, comprises a vat 1 whose upper part 1a is cylindrical and upwardly open whereas the lower part 1b is slightly conical and ensures the seating of the assembly of the vat by means of fastening feet 2.

In the cylindrical part 1a, at the upper limit of the part 1b, a perforated horizontal plate 3 is installed, preferably circular and rotatably mounted on a central pivot 4 by drive means known and not shown in the Figures. One may mention, for example, the belt drive which would be the best adapted to this type of machine by reason of the power demanded.

This plate 3 is surmounted peripherally by a cylinder 5 also perforated and held by means of fastening lugs 6 to the part 1a of the vat with which it defines an empty coronary space 7.

According to an essential feature of the invention, the perforations of the plate 3 are provided with sharp edges 8 offering on its surface a rough appearance ensuring the scraping of the hair of the skin. Obviously, the two surfaces of the plate 3 can have the same appearance which enables the plates to be turned over when the edges of one of its surfaces are worn.

The conical portion 1b is up-set internally towards the middle and a washing ramp 9 supplied with water (arrow C) is arranged around the central pivot 4 so that water flowing over the curved part drives the hair being introduced through the perforations of said plate. The part 1a, as for itself, is provided with another water inlet 10 (arrow F) defining a ramp on the inner edge of the vat and designed to drive the hairs dispersed in the space 7 towards the conical portion 1b and more particularly towards the windows 11 formed in the latter to ensure, as indicated by arrows E, the removal of this water and of the hair into the recovery tanks 12, constituted, for example, by baskets pierced to retain the hairs.

In addition, it will be noted that the cylinder 5 and the wall of the vat are advantageously each provided with a door, 13 and 14 respectively, having the purpose of enabling the removal, at the end of the operation, of the accumulation of depilated skins remaining on the plate 3.

The operation of this machine is as follows:

(1) The scraps of scalded skin are introduced into the cylinder 5 on to the plate 3 and then the vat 1 is closed by means of a suitable cover to avoid possible projections.

(2) The ramps 9 and 10 are supplied and the plate 3 placed in rotation. It will then be understood that the hairs torn off on the edges 8 are projected by centrifugal force from the plate through the openings of the cylinder 5 into the space 7 and then are driven, as shown by the arrow E, towards the recovery tanks 12.

(3) The doors 13 and 14 are opened to remove the depilated hides accumulated at the end of the operation on the plate 3.

FIG. 3 illustrates another embodiment of a machine according to the invention.

There will be recognized in this figure:

the vat 1, square in shape;

the circular and perforated horizontal plate 3;

the perforated and fixed cylinder 5;

the empty space 7 bounded by the wall of the vat 1 and the cylinder 5;

the inner washing ramp 10 mating the square shape of the vat.

It will be noted that the bottom of the vat 1 is cut along an oblique plane designed to facilitate the flow of water towards an opening formed on one of the sides of the vat and closed hermetically by a flap 15 slidable over said opening, as indicated by the arrow G.

In addition, this vat is provided with a hot water inlet 16 (arrow H) designed to permit the prior scalding of the hides in the vat 1.

The operation of such a machine is as follows:

(1) The scraps of skin are arranged on the plate 3.

(2) The vat 1 is filled with very hot water by opening the inlet 16 and the plate 3 is placed in rotation so that the vat 1 ensures a kneading action.

(3) The flap 15 is actuated to disengage the closed opening in order to remove the hot water and then the ramp 10 is placed in service whilst increasing the rotary speed of the plate 3 to complete the epilation of the hides which have just been scalded.

(4) The epilated hides are recovered by opening the door 14 and the door cut out in the perforated wall of the cylinder 5.

By way of example, the perforations of the plate 3 are preferably of circular shape with a diameter comprised between 20 and 35 mm and preferably of the order of 28 mm. The height of the sharp edge 8 with respect to the upper surface of the plate is of the order of 2 mm.

Preferably, the plate has a diameter comprised between 1 and 1.3 m, and in this case, the rotary speed is comprised between 300 and 450 rpm.

It is of course obvious also that other features within the spirit of the invention could be shown but the latter have not been discussed since they would contribute nothing more to the full comprehension of the invention.

I claim:

1. Machine for removing the hair from animal hide, comprising an upwardly open vat and a horizontal perforated plate arranged in the lower part of the vat and rotationally driven on a central pivot by suitable means, said plate being provided on its surface in contact with the material to be treated with sharp edges formed on the contour of said perforations, and bounded peripherally by a fixed perforated cylinder, defining with the inner wall of the vat a coronary space ensuring the removal of the hair stripped off and projected by centrifugal force into the openings of said cylinder.

2. Machine according to claim 1, including a washing ramp lining the upper inner edge of said vat.

3. Machine according to claim 1, wherein the vat and said perforated cylinder are provided with a door located at the height of the rotary plate.

4. Machine according to claim 1, wherein said vat has the shape of a truncated parallelepiped at its base along an oblique plane.

5. Machine according to claim 1, wherein said vat is cylinder whose conical shaped base determines a peripheral duct in which at least one downwardly open window is formed.

6. Machine according to claim 1, wherein a washing ramp lines the upper inner edge of said vat, said vat and said perforated cylinder being provided with a door situated at the height of the rotary plate, said vat having the shape of a truncated parallelepiped at its base along an oblique plane, and being provided with a hot water inlet.

7. Machine according to claim 6, wherein the bottom of the vat is open to ensure the drainage of the latter.

8. Machine according to claim 5, wherein the bottom of the vat is curved.

9. Machine according to claim 8, wherein the upper part of the curve is provided with a washing ramp arranged around the central pivot.

10. Machine according to claim 1, wherein the diameter of the perforations of the plate is comprised between 20 and 35 mm.

11. Machine according to claim 1, wherein the height of the sharp edges is of the order of 2 mm.

* * * * *